United States Patent [19]
Rothbart et al.

[11] Patent Number: 4,816,189
[45] Date of Patent: Mar. 28, 1989

[54] CLOSE-COUPLED PROCESS FOR IMPROVING THE STABILITY OF SOYBEAN OIL

[75] Inventors: Michael A. Rothbart, Fullerton; George W. Serbia, Orange; Elton H. Carey, Fullerton, all of Calif.

[73] Assignee: Beatrice/Hunt Wesson, Inc., Fullerton, Calif.

[21] Appl. No.: 894,698

[22] Filed: Aug. 7, 1986

[51] Int. Cl.[4] ............................ C09F 5/10; C11B 3/00
[52] U.S. Cl. ................................ 260/420; 260/410.7; 260/425; 260/428
[58] Field of Search ........... 260/420, 428, 425, 410.9; 426/417

[56] References Cited

U.S. PATENT DOCUMENTS

| | | | |
|---|---|---|---|
| 2,349,381 | 5/1944 | Royce | 260/398.5 |
| 3,673,228 | 6/1972 | Harris et al. | 260/428 |
| 3,758,532 | 9/1973 | Gibble | 260/420 |
| 3,780,076 | 12/1973 | Papahronis et al. | 260/420 |
| 3,857,866 | 12/1974 | Gibble et al. | 260/420 |
| 3,984,447 | 10/1976 | Cooper et al. | 260/420 |
| 3,994,943 | 11/1976 | Gibble et al. | 260/424 |
| 4,552,702 | 11/1985 | Schmid et al. | 260/428 |

OTHER PUBLICATIONS

J. C. Cowan, "Advances in Research on the Flavor Stability of Edible Soybean Oil", *Food Technology,* vol. 19, No. 9, pp. 107(1413)–110(1416), Sep. 1965.

"Food Oils and Their Uses", Second Edition, copyright 1983 by Theodore J. Weiss, Ph.d., pp. 72–76.

"Manufacturing Cooking Oil, Salad Oil, Margarine", Oct., 1974, by the Research Division at Virginia Polytechnic Institute and State University, pp. 9–12.

*Primary Examiner*—Werren B. Lone
*Assistant Examiner*—Vera C. Clarke
*Attorney, Agent, or Firm*—Pretty, Schroeder, Brueggemann & Clark

[57] ABSTRACT

A close-coupled method of treating unrefined, unbleached soybean oil to produce a stable edible frying oil. The close-coupled process involves performing a series of steps to refine and bleach unrefined, unbleached soybean oil in a continuous sequence without intermediate storage and without substantial exposure to oxygen in the air which can lead to oxidation of heated oil, as follows: treating unrefined, unbleached soybean oil with a caustic agent; heating and water washing the treated soybean oil; degassing the soybean oil to remove a substantial portion of any oxygen and water entrained in the oil; dispersing into the oil a minor amount of finely divided, activated metallic salts and oxides including bleaching earths, clays, etc.; and heating the resulting dispersion in a carbon dioxide atmosphere. The treated oil is then degassed to remove entrained carbon dioxide, filtered to remove particulates and then cooled to provide a refined, bleached soybean oil.

17 Claims, 1 Drawing Sheet

CLOSE-COUPLED PROCESS FOR IMPROVING THE STABILITY OF SOYBEAN OIL

BACKGROUND OF THE INVENTION

The present invention relates to a method of processing edible frying oils and more particularly toward a close-coupled process for improving the odor and thermal stability of unrefined, unbleached soybean oil.

Soybean oil represents a readily available and relatively inexpensive source of nutritious vegetable oil. However, finished soybean oil processed by conventional industrial practice has the characteristic of readily evolving objectionable odors at frying temperatures, that is, temperatures within the range of about 350 degrees F. to about 400 degrees F. or higher. This odor has been variously described as a beany, grassy and/or fishy smell, and is quite pungent, markedly unpleasant and very unappetizing. In the case of finished soybean oil (by "finished" is meant refined, bleached and deodorized soybean oil), this objectional odor can occur in a matter of seconds upon heating at or near frying temperature.

A variety of processes have been proposed to eliminate the objectionable frying odor of soybean oil and some of these processes have been used commercially for many years. One such process calls for partially hydrogenating the soybean oil. See "Advances in Research on the Flavor Stability of Edible Soybean Oil" by J. C. Cowan, published in *Food Technology,* Vol. 19, No. 9, pp. 107-146 (1413-1452), 1965. Partial hydrogenation has been quite successful in increasing flavor stability of soybean oil for room temperature use or storage. However, the hydrogenation process must be carefully controlled to prevent the resulting hydrogenated soybean oil from obtaining a lard-like consistency. Hydrogenation has a high energy requirement and necessitates large storage facilities during the intermediate stages of the process. It also increases the price of the finished soybean oil since it produces stearin which must be removed by a winterization process prior to marketing. This winterization process increases costs, including additional energy consumption, and reduces the over-all yield of finished marketable oil.

A second method which is commercially used today for increasing the stability of soybean oil is deodorization (see the above cited J. C. Cowan article). This involves a vacuum steam stripping of the oil, optionally in the presence of citric acid, to improve the storage flavor stability of soybean oil. However, this stability is only for a short period of time and the process has little, if any, effect on the odor stability of soybean oil at frying temperatures. Accordingly, deodorization processes have only limited effectiveness.

Another method of increasing the flavor stability of soybean oil is described in U.S. Pat. No. 2,349,381, issued May 23, 1944 to Harvey D. Royce. The method described in this patent comprises heating the soybean oil at a temperature between 240 degrees C. and 300 degrees C. out of contact with air and in the presence of finely divided particles of zinc, magnesium, or tin for a period of between 10 and 120 minutes. This method, which has not been commercially successful, increases the flavor stability of soybean oil for room temperature use, such as for salad oil. However, it has little effect in eliminating the undesirable odors that develop when frying with soybean oil.

U.S. Pat. No. 3,780,076, issued Dec. 18, 1973 to Basil Papahronis and Walter Gibble and U.S. Pat. No. 3,758,532, issued Sept. 11, 1973 to Walter Gibble, describe processes for stablizing the odor and aroma of unhydrogenated refined soybean oil at frying temperatures by means of a process including the steps of deaerating the oil; saturating the oil with carbon dioxide; treating the saturated oil with a copper-chromium catalyst at a temperature of about 250 degrees C. for about one hour, optionally in the presence of carbon; filtering the treated oil; and then bleaching and deodorizing the oil. The finished, treated oil exhibits satisfactory performance at frying temperature. However, these processes have not been considered economical and have not been put to commercial use due to the high energy requirement during the treatment step and the cost of the catalyst which is expended in the filtration after each treatment step. Large storage tanks are required between various steps of the treatment process, increasing the amount of energy needed and decreasing the physical space available for the treatment process itself.

Another method of producing a flavor and aroma stable oil is described in U.S. Pat. No. 3,857,866, issued Dec. 31, 1974 to Walter Gibble and Edward Reid. This method comprises degassing refined unhydrogenated soybean oil to remove a substantial portion of atmospheric oxygen from the oil, dissolving carbon dioxide in the degassed oil and then dispersing a minor amount of finely divided, activated metallic salts and oxides including bleaching earths, clays, etc., and heating the dispersion in a carbon dioxide atmosphere to a temperature between 212 degrees F. and 260 degrees F. for a predetermined length of time. The treated oil is then filtered and deodorized to provide a finished oil having satisfactory performance at frying temperature. Like the previous treatment processes, this method is susceptible to contamination of the soybean oil during processing by exposure to oxygen in the air or by settling during storage between intermediate steps of the treatment. Additional processing steps are necessary to reduce the contaminants in the soybean oil.

Thus, there exists a need for a method of treating unrefined, unbleached soybean oil to produce a stable edible frying oil which reduces energy costs, eliminates the necessity of storage during intermediate steps of the treatment and reduces contamination of the soybean oil

SUMMARY OF THE INVENTION

The present invention is directed to a close-coupled process for preparing refined, bleached soybean oil which exhibits enhanced frying stability. By "close-coupled process" is meant a process comprising the performance of a series of steps to refine and bleach unrefined, unbleached soybean oil in continuous sequence and without intermediate storage. The close-coupled process of the present invention eliminates the use of a vacuum dryer, a cooler, intermediate storage tanks for the storage of refined, unbleached soybean oil, and a steam heater, all of which are pieces of equipment that represent additional process steps required for the storage of refined, unbleached soybean oil prior to commencing a separate bleaching process. Consequently, the close-coupled process of the present invention achieves an energy savings since the refined, unbleached soybean oil no longer needs to be cooled prior to intermediate storage and then subsequently reheated before initiating the separate bleaching process, and a vacuum dryer has been eliminated. In addition, large inventories of substantial quantities of refined, unbleached soybean oil are eliminated, thereby reducing the possibility of oxidation by exposure to oxygen in the air while the oil is stored which results in an inferior product.

The lines between the various processing steps are all closed conduits to prevent contact between the soybean oil and oxygen in the air, and the oil being processed therethrough is preferably saturated with an inert gas, such as nitrogen or carbon dioxide, to further reduce the possibility of such contamination.

In general, the process involves the steps of: treating unrefined, unbleached soybean oil with a caustic agent; heating and water washing the treated oil; degassing the oil to remove a substantial portion of any oxygen and water entrained in the oil; dispersing into the oil a minor amount of finely divided, activated metallic salts and oxides including bleaching earths, clays, etc., and heating the resulting dispersion in a carbon dioxide atmosphere to a temperature between about 212 degrees F. to about 260 degrees F. for a predetermined time. The treated oil is then degassed to remove entrained carbon dioxide, filtered to remove particulates and cooled to provide a refined, bleached soybean oil.

The caustic agent preferably is sodium hydroxide, and the combined caustic agent/soybean oil is turbulently and intimately mixed for the purpose of exposing large surface areas of the oil to the caustic. This contact is maintained for a predetermined time, after which the resulting mixture is heated to a temperature ranging from about 120 degrees F. to about 160 degrees F., preferably between about 135 degrees F. to about 140 degrees F. A centrifuge is preferably used to remove the resulting soapstock from the oil, and the oil is then contacted with hot wash water, further heated and agitated for a sufficient time period to form an emulsified oil mixture. A second centrifuge is then preferably used to separate the emulsified oil mixture into a waxy aqueous phase, which is discarded, from the refined, unbleached oil.

According to another aspect of the invention, the first degassing step is preferably conducted under a vacuum of at least one-half atmosphere to remove entrained oxygen, thereby minimizing possible oxidation of the heated refined, unbleached oil. The first degassing step has the further advantage that it also dehydrates the wet oil.

Further according to the invention, after degassing the oil is saturated with carbon dioxide and the dispersion resulting from the addition of the treating agent to the oil is preferably heated in a carbon dioxide atmosphere to maintain the reaction temperature of from about 212 degrees F. to about 260 degrees F., and more particularly between about 240 degrees F. to about 245 degrees F., for a time period ranging from about 10 minutes to about six hours, more particularly from about 12 minutes to about 20 minutes depending upon temperature, the particular treating agent, and the concentration of the reactants.

According to still another aspect of the invention, the second degassing step is preferably conducted under a vacuum of at least one-half atmosphere to remove substantially all of the carbon dioxide. The subsequent filtering step can advantageously be carried out at a temperature of about 220 degrees F. to about 240 degrees F. in a nitrogen-inerted filter.

Other features and advantages of the present invention will become apparent from the following detailed description, taken in conjunction with the accompanying drawing, which illustrates, by way of example, the principles of the invention.

DETAILED DESCRIPTION OF THE INVENTION

Figure 1:
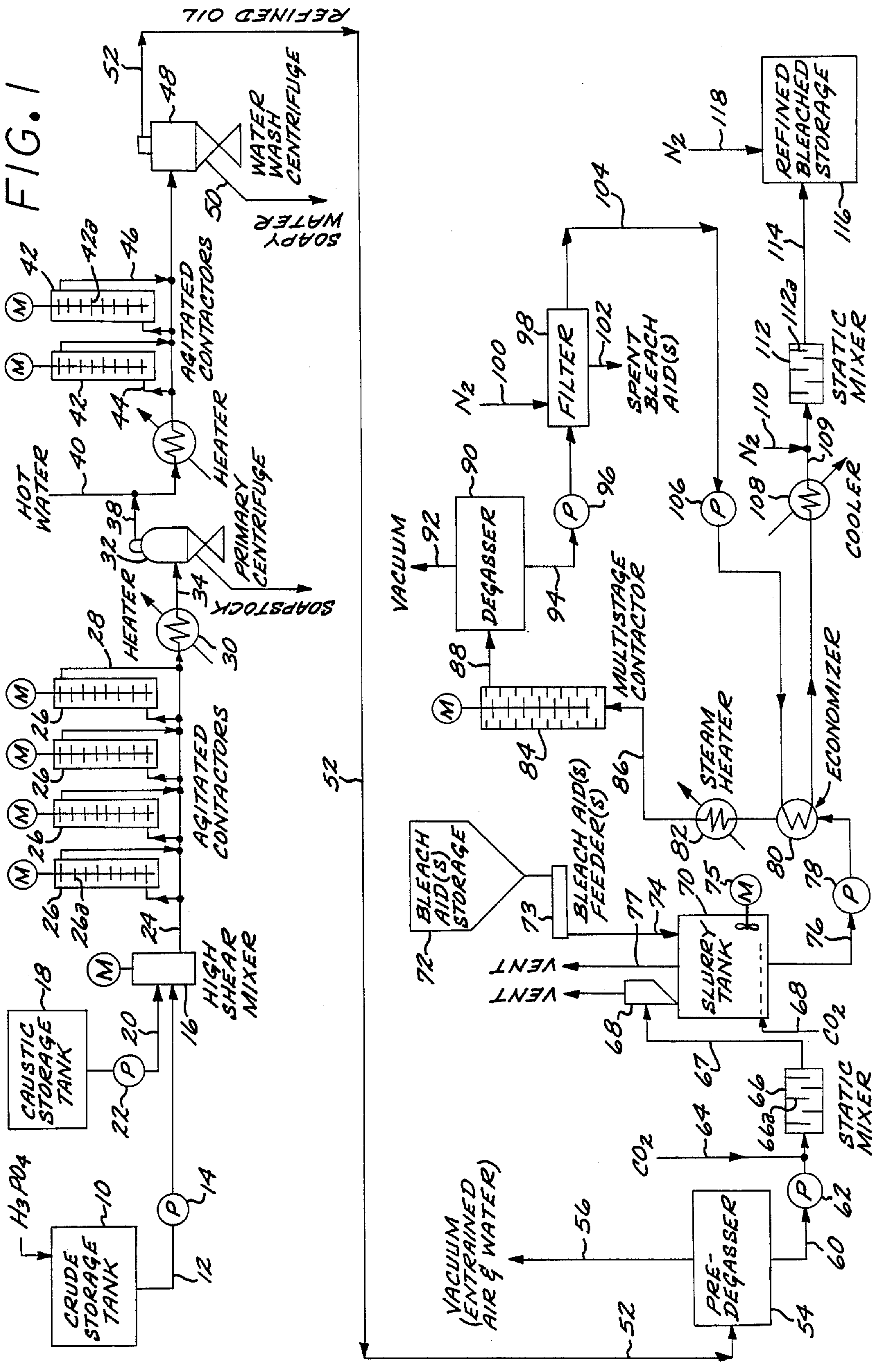
FIG. 1 is a schematic flow diagram of the close-coupled process for treating unrefined, unbleached soybean oil according to the present invention.

As shown in FIG. 1, unrefined, unbleached soybean oil is stored in a crude storage tank 10 where it is preferably maintained at a temperature of about 100 degrees F. for optimum pumping efficiency. Phosphoric acid may be blended with the unrefined, unbleached soybean oil while it is stored in tank 10 to degum the oil.

The unrefined, unbleached soybean oil is pumped through line 12 by pump 14 into high shear mixer 16 where it is combined with an aqueous caustic from caustic storage tank 18 which is similarly pumped into the high shear mixer 16 through line 20 by pump 22. Any alkali or alkaline composition is suitable for use as the aqueous caustic. Sodium hydroxide, potassium hydroxide, and sodium carbonate are preferred. The aqueous caustic is added in an amount in excess of the stoichiometric amount required to react with the free fatty acids in the oil. The high shear mixer 16 turbulently mixes the caustic and the oil to create intimate contact therebetween by breaking down the oil into very small drops and exposing a large surface area to the caustic.

Since the chemical reaction between the caustic and the free fatty acids in the oil is time-dependent, the caustic/oil mixture passes through line 24 into a series of agitated contactors 26, the number of contactors necessary depending upon the reaction rate and the percentage by weight of free fatty acids in the oil. Preferably, no more than four (4) contactors are used. The agitated contactors 26 contain a series of spaced baffling elements *26a* to effect the desired mixing and to maintain the oil and the caustic in contact for a predetermined time period sufficient to make sure that the chemical reaction between the free fatty acids and the caustic is completed. Such contactors are of conventional design well known in the industry and can be purchased, for example, from Alfa-Laval located at 2115 Linwood Avenue, Fort Lee, N.J. 07024.

The caustic/oil mixture exits the agitated contactors through line 28, at which time the caustic/oil mixture is heated by heater 30 to a temperature ranging from about 120 degrees F. to about 160 degrees F., preferably between about 135 degrees F. to about 140 degrees F. The heated caustic/oil mixture then passes into the primary centrifuge 32 through line 34 where the soapstock formed by the reaction between the caustic and the free fatty acids is removed through line 36, together with any gums that were solubilized by the addition of phosphoric acid in tank 10. Preferably, the centrifuge 32 is hermetically sealed to modulate where the separation occurs. Such centrifuges are conventional in the industry, and can also be purchased, for example, from Alfa-Laval located at 2115 Linwood Avenue, Fort Lee, N.J. 07024.

After leaving the primary centrifuge 32 through line 38, a sufficient amount of hot wash water is added to the oil via line 40 for the removal of at least ninety percent (90%) of the residual soapstock. Generally, the amount of hot water added constitutes about ten percent (10%)

by volume of the oil. While the temperature of the hot water is not critical, since the oil and water mixture is heated to a temperature ranging from about 175 degrees F. to about 185 degrees F., preferably about 180 degrees F., before passing into the agitated contactors 42, for energy and economic efficiency the wash water preferably is heated to a temperature between about 175 degrees F. to about 185 degrees F. before mixing with the oil. The heated wash water/oil mixture enters the agitated contactors 42 through line 44 and contacts a series of spaced baffling elements 42a which provide sufficient time for the water to contact the oil and form an emulsion. The number of contactors necessary will depend upon the quality of the oil, for example, the level of free fatty acids originally contained in the unrefined, unbleached soybean oil, but preferably no more than two contactors are used. Such contactors are also of conventional design well known in the industry and can be purchased, for example, from Alfa-Laval located at 2115 Linwood Avenue, Fort Lee, N.J. 07024.

The oil and water emulsion exits the contactors 42 via line 46 and passes into water wash centrifuge 48 which is preferably operated at atmospheric pressure. Centrifuge 48 separates the emulsion into a heavy phase and a light phase, i.e., the waxy aqueous phase is removed and discarded by means of line 50 while the now refined, unbleached oil passes through line 52 into the pre-degasser 54. The refined, unbleached oil may optionally be filtered (not shown) before entering the pre-degasser.

During degassing in the pre-degasser, a vacuum of at least one-half atmosphere, preferably less than 5 cm. of mercury, is drawn on the pre-degasser through line 56 which leads to a trap and a vacuum pump (not shown). Because the refined, unbleached oil is wet, i.e., it contains residual amounts of water from the water wash which could lead to hydrolysis and the formation of fatty acids, degassing also dehydrates the wet oil by pulling off entrained water as well as any oxygen still entrained in the oil. Preferably, at least 99% of the oxygen entrained in the oil is removed from the soybean oil during this operation to prevent oxidation of the heated oil which will cause off flavors and odors to develop during the remainder of the process.

The degassed, dehydrated, refined, unbleached soybean oil is removed from the pre-degasser through line 60 by means of pump 62. Before the oil enters static mixer 66, an inert gas, preferably carbon dioxide, is introduced to the oil through line 64 in an amount in excess of the amount required to saturate the oil. Mixer 66 comprises a series of baffles 66a sufficient in number to disperse and saturate the carbon dioxide in the oil. Carbon dioxide is preferred due to its "inverse" solubility, i.e., as the refined oil is heated, additional carbon dioxide is not required to keep the oil saturated. Thus, it is believed that the use of carbon dioxide provides an additional "seal" to protect the heated oil from absorbing oxygen that is in the air.

The carbon dioxide-saturated oil passes via line 67 into vent 68 which vents excess carbon dioxide before the oil passes into slurry tank 70. An activated treating agent is added to slurry tank 70 from a bleach aid storage tank 72 through line 74. The treating agent comprises 1%-3% by weight of finely divided, activated, organic metallic salts or oxides, including bleaching earths, clays, etc., and optionally containing from 0.1%-0.4% by weight activated carbon. Because the close-coupled process of the present invention is a continuous rather than a batch process, the treating agent is added to the slurry tank 70 by means of automatic feeder 73 which precisely meters the proper amount of the treating agent from storage tank 72 into slurry tank 70. A minor amount of carbon dioxide may be added to slurry tank 70 by means of line 69 in order to keep the tank inert to further reduce the possibility that the heated oil may absorb oxygen from the air. Such carbon dioxide is vented through line 77.

The resulting dispersion is preferably stirred in the slurry tank 70 by stirrer 75 before the treated oil is pumped through line 76 by means of pump 78 to a heat exchanger (sometimes referred to as an "economizer") 80 and a heater 82, preferably a steam heater, before entering a multi-stage contactor 84 via line 86. For energy efficiency, the dispersion can be heated by utilizing the refined, bleached oil prior to cooling and storage. Heat exchanger 80 preferably increases the temperature of the dispersion between about 25 degrees F. to about 40 degrees F. Heater 82 subsequently heats the dispersion to a temperature between about 212 degrees F. to about 260 degrees F., preferably between about 240 degrees F. to about 245 degrees F. Below 212 degrees F. there is an absence of beneficial effect within the multi-stage contractor 84. At temperatures above 260 degrees F., refined soybean oil may deteriorate, break-down and degrade in flavor and other characteristics. Such high temperatures will also deleteriously affect the lifetime of filter 98 described below.

Line 86 is a bottom feed into multi-stage contactor 84 so that the flow of the heated dispersion is in the same direction as the flow of carbon dioxide that may come out of solution, thereby avoiding back mixing. Multi-stage contactor 84 is of conventional design, such as the Lightin' brand jacketed multi-stage contactor Mode Mark III manufactured by Mixing Equipment Co., Inc., of Rochester, N.Y. The contactor 84 is of sufficient capacity to insure that the oil dispersion and carbon dioxide are in contact for a sufficient period of time to complete the bleaching treatment. Generally, the reaction period is between 10 minutes and 6 hours, although other reaction times can be employed depending upon the reaction temperature, the activated treating agents and their concentration, and carbon dioxide concentration. Preferably, in the close-coupled process of the present invention, the reaction period is between about 12 minutes to about 20 minutes.

The carbon dioxide-saturated, treated soybean oil passes from multi-stage contactor 84 through line 88 to a post degasser 90. The soybean oil is degassed in the post degasser under a vacuum drawn through line 92 of at least one-half atmosphere, preferably under a vacuum of less than 5 cm. of mercury, to remove substantially all of the carbon dioxide and water from the oil dispersion. It is important that the carbon dioxide be removed because it can cause rapid deterioration of soybean oil. The carbon dioxide and water exhausts through line 92 which leads to a trap and a vacuum pump (not shown).

The degassed oil is pumped from the post degasser 90 through line 94 by means of pump 96 to filter 98. Because the viscosity of the degassed oil is lower at higher temperatures, for faster and more efficient filtering the degassed oil is preferably filtered at a temperature of about 220 degrees F. to about 240 degrees F. Preferably, the filter is also inerted with nitrogen and a flow of nitrogen is maintained through line 100 to further reduce the possibility that the heated oil will absorb any oxygen from the air. The spent activated treating agents with entrained odor and taste-forming bodies are removed from filter 98 through lnne 102 and discarded.

The filtered oil is pumped from filter 98 through ine 104 by means of pump 106 through heat exchanger 80 and cooler 108, preferably a cold water cooler. As the now refined and bleached oil passes through heat exchanger 80, it is used to increase the temperature of the dispersion from line 76. Accordingly, the temperature of the refined and bleached oil is reduced to about 200 degrees F. The cooler further reduces the temperature of the oil to preferably between about 125 degrees F. to about 130 degrees F. After the oil exits from cooler 108 through line 109, nitrogen is preferably added via line 110 in an amount in excess of that required to saturate the oil, and the combined nitrogen/oil passes into static mixer 112. The nitrogen may be introduced as a spray through jets, bubbled through a sparger ring, or other equivalent means of liquid-gas contact. As described above, the mixer 112 comprises a series of baffles **112*a* sufficient in number to disperse and saturate the nitrogen in the oil. The cooled refined, bleached soybean oil can then be pumped through line 114 into further processing (not shown), including a deodorization process, into a storage tank 116, or into a packaging process (not shown). If the refined, bleached oil is stored in tank 116, the tank is also preferably inerted by nitrogen via line 118** and the temperature of the stored oil is preferably maintained at about 100 degrees F. by internal heating coils (not shown) to keep the nitrogen in solution and for optimum pumping efficiency.

Thus, it can be seen that the continuous, close-coupled process of the present invention also affords the opportunity of a continuous process from unrefined, unbleached soybean oil to a refined, bleached, and deodorized finished oil.

The various lines in the close-coupled method are closed conduits. The various processing elements of the steps in the method are closed containers. The steps are performed in continuous sequence and without intermediate storage. After pre-degassing, the oil being processed is saturated with an inert gas and the inert gas may also be added to the oil being processed at any point or points thereafter. It will be appreciated that these steps substantially reduce the possibility that the heated oil which is "starved" for gas after degassing will absorb oxygen in the air.

It will also be appreciated that the close-coupled process of preparing treated finished soybean oil from unrefined, unbleached soybean oil is a continuous process without intermediate storage, which is energy and space efficient and reduces treatment processing time. The close-coupled process also eliminates process treatment steps from earlier processes while still creating a finished product which is a clear, almost odorless, virtually colorless, edible, highly nutritious cooking, salad or frying soybean oil.

While a particular form of the invention has been illustrated and described, it will be apparent that various modifications can be made without departing from the spirit and scope of the invention. Accordingly, it is not intended that the invention be limited, except as by the appended claims.

We claim:

1. A close-coupled method for improving the odor and flavor stability of unrefined, unbleached soybean oil at a temperature of about 350 degrees F. to 400 degrees F., said method comprising performing a series of steps in continous sequence without intermediate storage and without substantial exposure to oxygen in the air, as follows:

mixing unrefined, unbleached soybean oil with a caustic agent;

water washing the caustic-treated, unbleached soybean oil to produce refined, unbleached soybean oil;

degassing the wet refined soybean oil under vacuum to remove a substantial portion of oxygen and water entrained in said wet oil;

dispersing in said degassed oil a minor amount of a treating agent for bleaching said oil, said treating agent consisting essentially of finely divided, activated metallic salts or oxides;

heating the dispersion;

contacting the heated dispersion with carbon dioxide for a predetermined time to bleach and stabilize said heated oil;

degassing the treated oil to remove a substantial portion of the carbon dioxide from said treated oil;

filtering the degassed treated oil to remove the spent treating agents; and cooling the filtered oil to produce refined, bleached soybean oil having improved odor and flavor stability at said temperature of about 350 degrees F. to 400 degrees F.

2. The close-coupled method according to claim 1 in which the unrefined, unbleached soybean oil is saturated with an inert gas immediately subsequent to the first degassing step.

3. The close-coupled method according to claim 1 in which the water washing step comprises the steps of:

contacting said oil with hot wash water to form an emulsified oil mixture; and centrifuging said emulsified oil mixture to separate a waxy aqueous phase from the oil.

4. The close-coupled method according to claim 1 in which the first degassing step is conducted under a vacuum of at least one-half atmosphere.

5. The close-coupled method according to claim 1 in which the first degassing step includes dehydrating said oil during degassing.

6. The close-coupled method according to claim 1 in which the treating agent further comprises a minor amount of activated carbon.

7. The close-coupled method according to claim 1 in which the step of heating the dispersion is carried out at a temperature of from about 212 degrees F. to about 260 degrees F.

8. The close-coupled method according to claim 1 in which the step of contacting with carbon dioxide is carried out for between about 10 minutes and about 6 hours.

9. The close-coupled method according to claim 1 in which the step of contacting with carbon dioxide further includes heating the dispersion to maintain the reaction temperature necessary to stabilize the oil.

10. The close-coupled method according to claim 1 in which the second degassing step is carried out under a vacuum of at least one-half atmosphere.

11. The close-coupled method according to claim 1 in which the filtering step is carried out at a temperature of about 220 degrees F. to about 240 degrees F. in a nitrogen inerted filter.

12. A refined, bleached, soybean oil having odor and flavor stability at a temperature from about 350 degrees F. to about 400 degrees F. produced according to the close-coupling method of claim 1.

13. A close-coupled method for improving the odor and flavor stability of unrefined, unbleached soybean oil at a temperature of about 350 degrees F. to about 400 degrees F., said method comprising performing a series of steps in continuous sequence without intermediate storage and without substantial exposure to oxygen in the air, as follows:

adding a caustic agent to the unrefined, unbleached soybean oil;

turbulently mixing the caustic agent with the oil;

centrifuging said oil and caustic agent mixture to remove the resulting soapstock;

contacting said oil with wash water to form an emulsified oil mixture;

centrifuging said emulsified oil mixture to separate a waxy aqueous phase from the refined oil;

degassing the wet refined soybean oil under a vacuum;

dehydrating said wet refined soybean oil during degassing;

dispersing in said wet oil a minor amount of an activated treating agent for bleaching said oil;

heating the dispersion at a temperature of from 212 degrees F. to 260 degrees F.;

contacting the heated dispersion with heated carbon dioxide for a period between 10 minutes and 6 hours to protect the oil from absorbing oxygen and further heating the heated dispersion to maintain the reaction temperature until the bleaching treament of the oil is completed whereby the stability of the oil is improved;

degassing the treated oil under a vacuum to remove a substantial portion of the carbon dioxide from said treated oil;

filtering the degassed treated oil to remove the spent treating agents; and cooling the filtered oil to produce refined, bleached soybean oil having improved odor and flavor stability at said temperature of about 350 degrees F. to about 400 degrees F.

14. A close-coupled method for improving the odor and flavor stability of unrefined, unbleached soybean oil at a temperature from about 350 degrees F. to about 400 degrees F., said method comprising performing a series of steps in continuous sequence without intermediate storage and without substantial exposure to oxygen in the air, as follows:

adding a caustic agent to the unrefined unbleached soybean oil;

turbulently mixing the caustic agent and the oil;

centrifuging said oil to remove the resulting soapstock;

contacting said oil with wash water to form an emulsified oil mixture;

centrifuging said emulsified oil mixtuer to separate a waxy aqueous phase from the refined oil;

degassing the wet refined soybean oil under a vacuum of less than 5 cm of mercury;

dehydrating said wet refined soybean oil during degassing;

dispersing in said oil a minor amount of an activated treating agent for bleaching said oil, said treating agent consisting essentially of bleaching earths or clays and a minor amount of activated carbon;

heating the dispersion at a temperature of from 212 degrees F. to 260 degrees F., said heating conducted at least paritally by a heat exchanger;

contacting the heated dispersion with heated carbon dioxide for a period between about 10 minutes to about 6 hours to protect the heated oil from absorbing oxygen and further heating the heated dispersion to maintain the reaction temperature until the bleaching treatment of the oil is completed whereby the stability of the oil is improved;

degassing the treated oil under a vacuum of less than 5 cm of mercury to remove a substantial portion of the carbon dioxide from said treated oil;

filtering the degassed treated oil at a temperature of about 220 degrees F. to about 240 degrees F. in a nitrogen inerted filter to remove the spent treating agents; and cooling the filtered oil to produce refined, bleached soybean oil having improved odor and flavor stability at said temperature of about 350 degrees F. to about 400 degrees F.

15. A close-coupled process according to claim 1 wherein the metallic salts or oxides comprise bleaching earths or clays.

16. A close-coupled process according to claim 1 wherein the treating agent includes a minor amount of activated carbon.

17. A close-coupled process according to claim 13 wherein the treating agent includes a minor amount of activated carbon.

* * * * *